Nov. 22, 1927.
T. A. GUERRA
1,650,512
FEEDER GEAR
Filed May 19, 1926
3 Sheets-Sheet 1
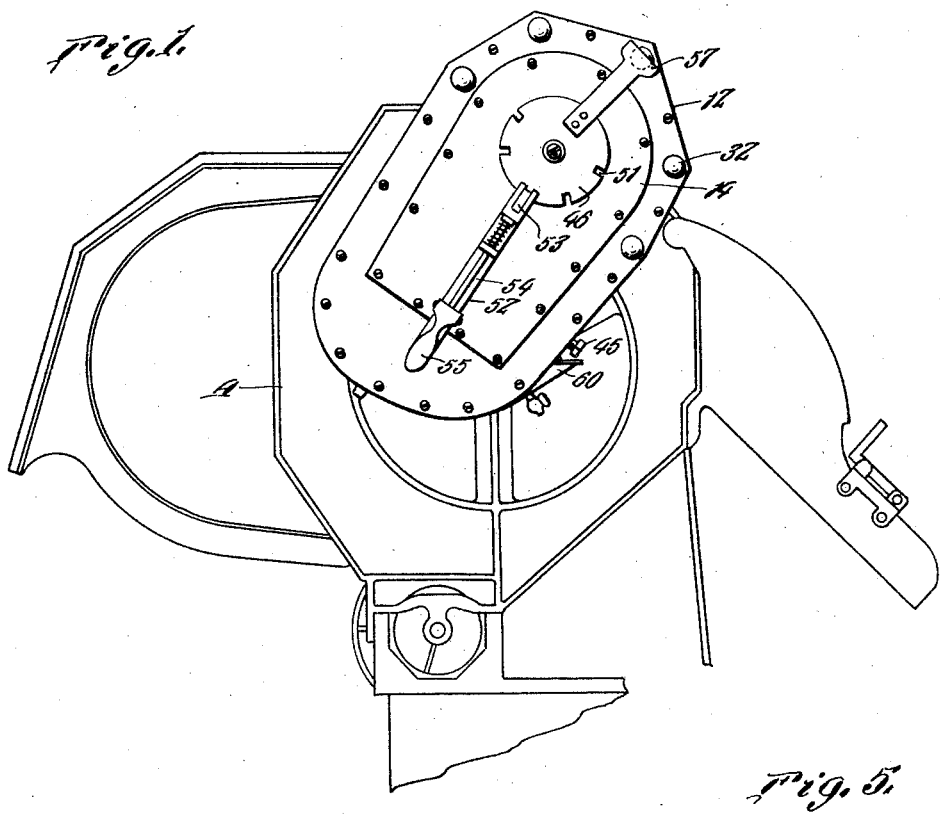
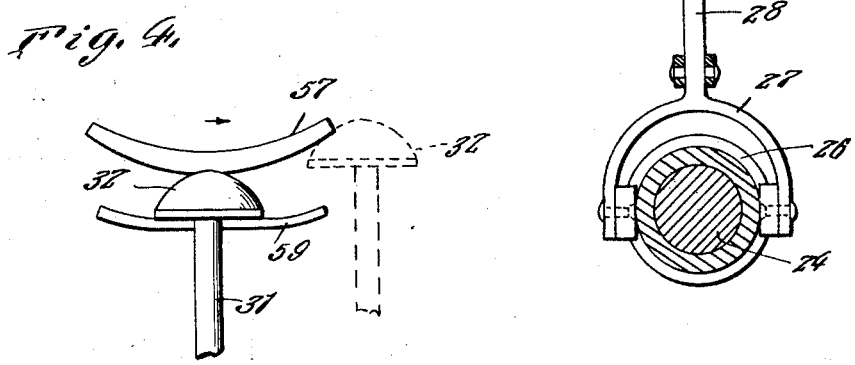
T. A. Guerra
INVENTOR
BY Victor J. Evans
ATTORNEY

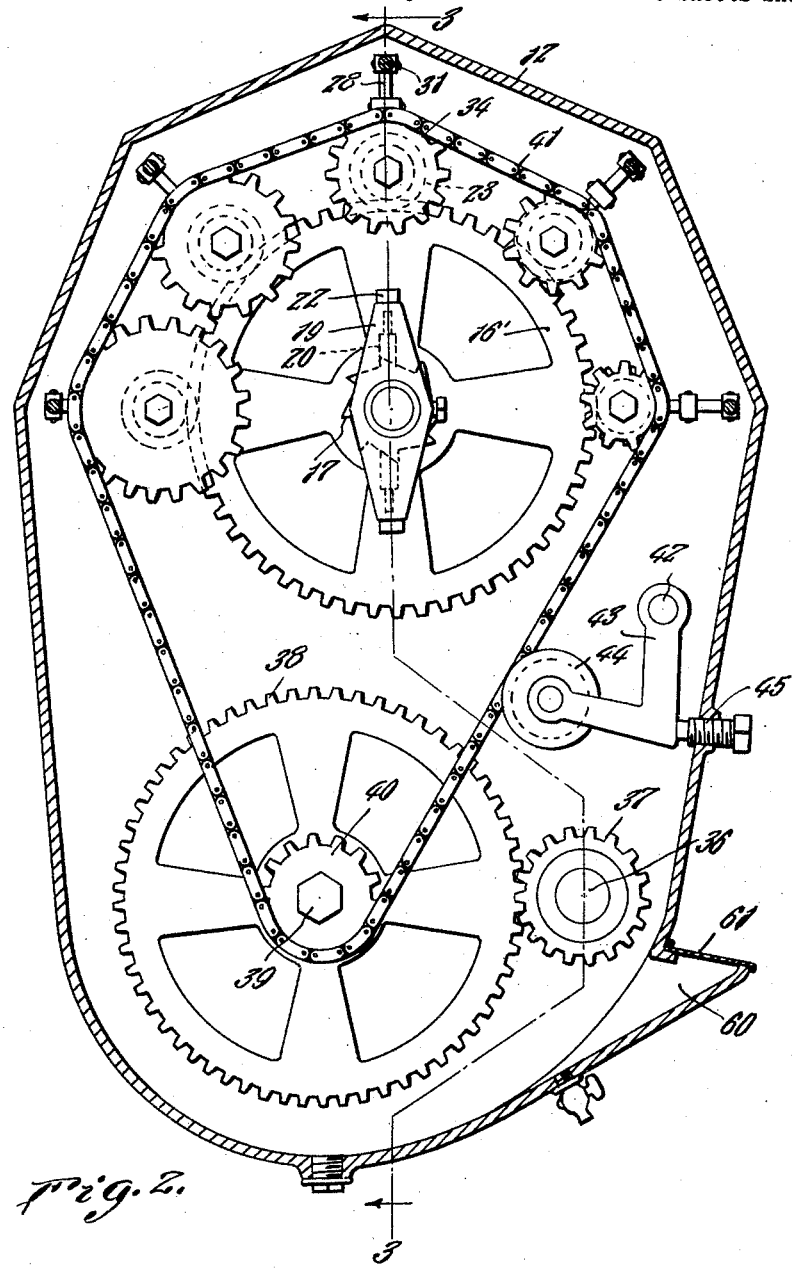

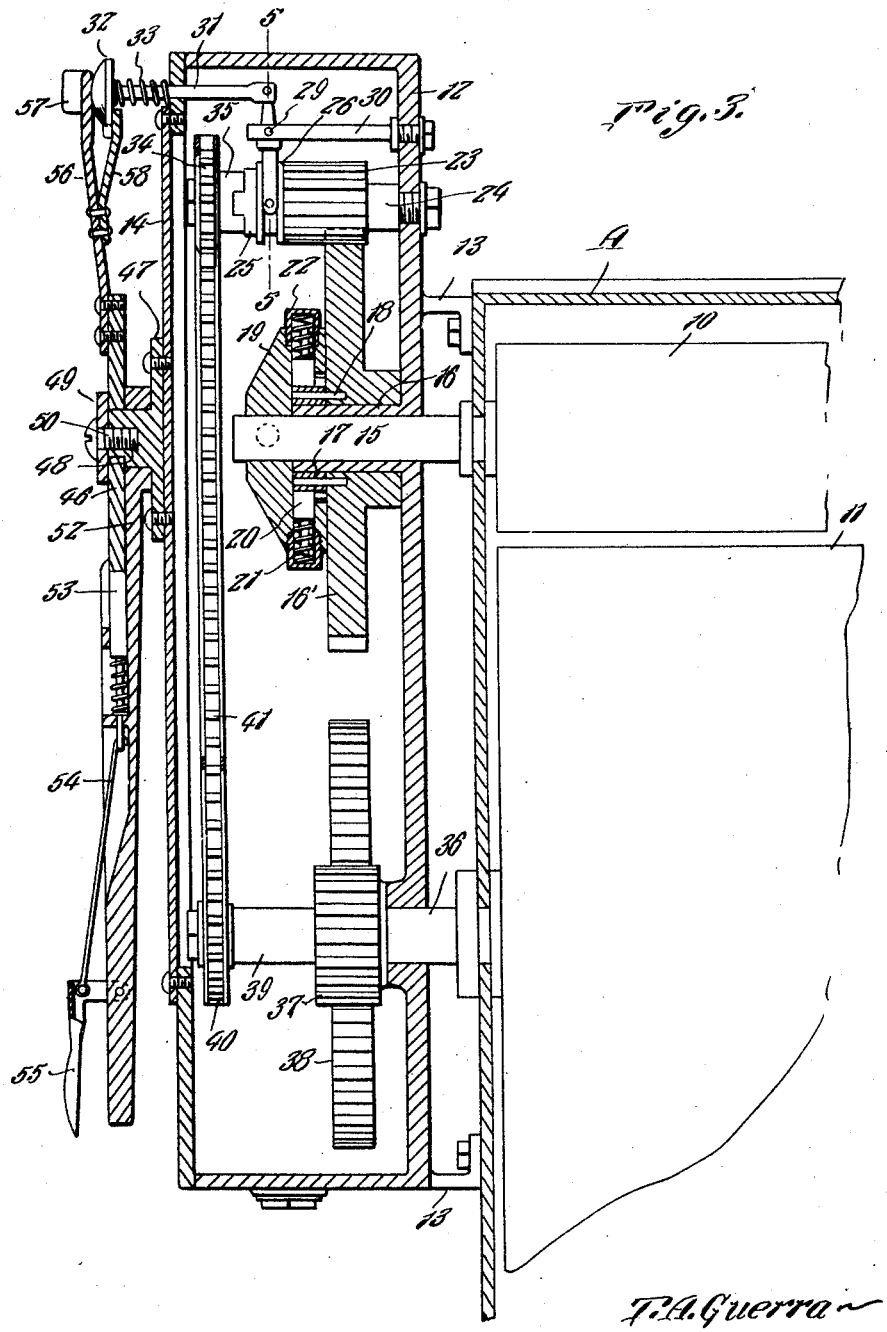

Patented Nov. 22, 1927.

1,650,512

UNITED STATES PATENT OFFICE.

TORIBIO A. GUERRA, OF SAN DIEGO, TEXAS.

FEEDER GEAR.

Application filed May 19, 1926. Serial No. 110,284.

This invention relates to cotton gins, and more particularly to a mechanism for operating the feeder rollers, whereby the latter can be rotated at different desired speeds, as the occasion may require, the mechanism being controlled by a single manually controlled element, so that the speed changes can be quickly made at the will of the operator.

In carrying out the invention I arrange the mechanism forming the subject matter of this invention within a casing arranged at one side of the gin, thus maintaining the mechanism free from dust, dirt and other foreign matter, the various parts of the mechanism being oiled from a supply or pool in the bottom of the casing.

More specifically stated, the invention comprehends the use of a gear associated with the shaft of one of the feeder rollers by a pawl and ratchet mechanism, which permits said rollers to be operated at different desired speeds, the gear being rotated by one of a group of clutch devices, each of the latter constituting a unit adapted to be singly and selectively employed for the purpose of rotating the gear at a predetermined speed.

In accordance with the present invention, the various clutch devices each embody a driven clutch sprocket normally spaced from a cooperating clutch pinion, the latter meshing with the gear of the feeder roller, while the various clutch sprockets successively increase in diameter, and are adapted to be singly called into use so that the feeder rollers can be rotated at different speeds.

Another object of the invention resides in a novel construction of means including a single operating lever which is used for selectively operating the clutch devices, so that a change in speed of the feeder rollers can be quickly and conveniently effected.

Other objects of the invention will appear when the following detailed description is read in connection with the accompanying drawings, the invention residing in the construction, combination and arrangement of parts as claimed.

In the drawings forming part of this application like numerals of reference indicate similar parts in the several views and wherein:

Figure 1 is a view in elevation of a cotton gin feeder showing the location of the mechanism forming the subject matter of the present invention.

Figure 2 is a vertical sectional view through the casing enclosing the mechanism, the latter being shown in elevation.

Figure 3 is a sectional view taken on line 3—3 of Figure 2.

Figure 4 is a fragmentary view of the means employed for controlling the clutch units.

Figure 5 is a sectional view on line 5—5 of Figure 3.

Referring to the drawings in detail A indicates generally a gin feeder of any well known construction, one of the feed rollers being indicated at 10 in Figure 3, while the cleaning cylinder is indicated at 11 in the same figure.

The mechanism forming the subject matter of the present invention is housed within a suitable casing indicated at 12 and arranged at one side of the gin, being supported thereon by suitable brackets 13 as clearly illustrated in Figure 3. One side of this casing is provided with a large opening through which access may be had to the mechanism for the purpose of repair as the occasion may require, but which opening is normally closed by a plate 14 removably attached to the casing in any suitable manner.

The shaft 15 of one of the feeder rollers projects within the casing 12 through a sleeve 16 constituting a bearing for said shaft, while loosely journaled upon said sleeve is a gear 16' of any suitable diameter. This gear 16' is connected with the shaft 15 by means of a pawl and ratchet mechanism, the ratchet wheel 17 being loosely mounted upon the shaft 15 and carried by the gear 16, said wheel being secured to the gear by means of pins 18. As shown in Figure 3, the shaft 15 projects an appreciable distance beyond the ratchet wheel 17 and has secured thereto a casting 19 which supports a pair of spring pressed pawls 20, the spring for each of the latter being indicated at 21 and capable of being adjusted to vary its tension by means of an adjustable cap 22. The gear 16' is thus capable of being rotated at different predetermined speeds, whereby the feed rollers can be quickly accelerated, or their speed of rotation reduced in a quick and convenient manner as the occasion may require.

For the purpose of rotating the gear 16' at different speeds, I employ a plurality of clutch units arranged circumferentially about approximately one-half of the periphery of the gear 16' in the manner clearly illustrated in Figure 2, the clutch units being adapted to be singly used for the purpose of rotating the gear. Each clutch unit embodies a sliding pinion 23 which meshes with the gear 16' and slidable on a suitable shaft 24. Carried by the outer end of each pinion 23 is a clutch member 25 provided with a collar 26 with which a yoke 27 is connected in the usual well known manner, for the purpose of shifting the clutch member 25 and its pinion into and out of engagement from its cooperating clutch member to be presently described. The stem or shank 28 of the yoke is pivoted as at 29 upon an arm 30 supported by one wall of the casing 12, while connected with the upper end of the stem or shank 28 is a horizontally disposed rod 31. It might here be stated that all of the clutch units are identical in construction, and a detail description of one will suffice for all. The rod 31 slides through an opening in the adjacent wall of the casing 12 and carries a substantially cam-shaped head 32, between which and said wall of the casing is arranged a coil spring 33. This spring obviously surrounds the rod 31 and functions to normally maintain the pinion 23 and its clutch member 25 in neutral position. Each clutch unit further embodies a driven sprocket 34, the hub of which constitutes a clutch member 35 for cooperation with the clutch member 25 above referred to. It will be noted upon inspection of Figure 2 that the driven clutch sprockets successively increase in diameter from one side of the gear 16' to the other side thereof, and that inasmuch as these clutch devices are adapted to be singly called into use, it is manifest that the gear 16' can be rotated at different predetermined speeds. While the sprockets 34 vary in diameter with relation to each other, it is to be noted that the pinions 23 are all of the same diameter. Furthermore the clutch member 25 of each pinion is normally spaced from the cooperating clutch member 35 of the adjacent sprocket, and that the latter are singly and selectively employed in a manner to be hereinafter described.

The shaft 36 of the cleaning cylinder 11 also projects within the casing 12 and supports a small pinion 37 which meshes with a gear 38 journaled on a stub shaft 39 arranged within the casing 12. Carried by the shaft 39 is a small sprocket 40 about which and the clutch sprockets 34 is trained an endless chain 41. Inasmuch as the gear 38 and sprocket 40 are simultaneously rotated from the pinion 37, it is manifest that all of the clutch sprockets 34 are simultaneously rotated through the instrumentality of the endless chain 41. Arranged within the casing and pivoted as at 42 is an angular-shaped lever 43 which supports a flanged roller 44 which engages the adjacent run of the chain 41 and used to maintain the chain sufficiently taut. An adjustment element 45 is supported on one wall of the casing 12 and bears against the lever 43 to adjust the latter and the roller 44 with relation to the chain as the occasion may require.

From the foregoing description it will be noted that the clutch driven sprockets 34 are simultaneously rotated by the chain 41 as long as the cotton gin is in operation, and that the clutch members 25 and 35 respectively of each clutch unit are normally spaced. When it is desired to rotate the feed rollers 10 with a certain or predetermined speed, calculated by the gear ratio between the gear 16' and the various sprockets 34, it is only necessary to operate the rod 31 of the particular clutch unit, thereby shifting the pinion 23 with its clutch member 25 into operative association with the clutch member 35 of said unit.

In order that speed changes of the feed rollers can be quickly and conveniently made, I provide a notched disk 46 which is rotatably mounted on the cover plate 14 of the casing, the latter being provided with a bracket 47 including a reduced hub-like portion 48 upon which said disk 46 is supported. The disk is maintained thereon by a suitable washer 49 and a threaded element 50 which is passed through the washer and screwed into the hub-like portion of the bracket as clearly illustrated in Figure 3. The notches in the disk are arranged about the periphery thereof and indicated at 51. Journaled on the hub-like portion 48 of the bracket is one end of a manually operable lever 52 which supports a sliding spring pressed dog 53 connected by a rod 54 with an auxiliary lever 55 supported upon the lower end of the lever 52. The lever 52 is manifestly employed to rotate the disk 46 for a purpose to be presently set forth, the sliding dog 53 when arranged in one of the notches 51, providing a connection between the lever 52 and the disk 46. Carried by and projecting beyond the periphery of the disk 46 is what I term a shift lever 56, the upper end of which supports a transversely disposed arm 57 which is curved longitudinally to cooperate with the heads 32 of the rods 31 with a sort of a cam-like action. Arranged on one side of the shift lever 56 is a short lever 58, the upper end of which also supports a transverse arm 59 adapted to be arranged at the opposite side of the heads 32 of said rods 31 to assist in moving said rods in a direction to disengage the cooperating clutch members of any particular unit with which the lever is being used. In other words when it is desired to use a particular clutch unit, the lever 52 is swung upon its pivot, either to the right or to the left, until the dog 53 is brought into alignment with the particular notch 51 in the disk 46, and allowed to enter said notch to provide a connection between the disk and lever 52. The lever is then moved in the proper direction to rotate the disk 46 and the shift lever 56 in the direction of the particular clutch unit to be used. As the arm 57 of the shift lever engages the head 32 of the rod 31 of said unit, the said rod is gradually moved inwardly against the tension of the spring 33, thereby rocking the yoke 27 upon its pivot 29 in a direction to move the adjacent pinion 23 and its clutch member 25 into operative association with the clutch member 35 of the adjacent sprocket 34. One of said clutch units is then operatively associated with the gear 16' to rotate the latter at a particular speed, and it is clear that the speed of this gear 16' and feeder rollers 10 can be either accelerated or decreased by simply shifting the lever 56 out of engagement with any particular clutch unit, and into engagement with another of said clutch units as desired. When the lever 56 is being moved away from the head 32 of any particular clutch unit, the arm 58 engages the opposite side of the head 32 in a manner to assist the spring 33 in returning the rod 31 to its normal position and incidentally separate the cooperating clutch members 25 and 35 respectively.

The various parts of the mechanism are lubricated from a pool or supply of oil in the bottom of the casing 12, oil being introduced into the casing through a spout 60 which is normally closed by a cover 61. A part of the gear 38 passes through this supply of oil and is splashed and carried by the gear 38 and chain 41 onto the gear 16 and the various sprockets 34, a certain quantity of the oil dripping from the various parts onto the hubs or bearings for the various gears, and in this way the mechanism is maintained lubricated.

While it is believed that from the foregoing description the nature and advantages of the invention will be readily understood I desire to have it known that I do not limit myself to what is herein shown and described, and that such changes may be resorted to when desired as fall within the scope of what is claimed.

What is claimed is:

The combination with a rotatable shaft, of a gear arranged thereon, a pawl and ratchet structure connecting the gear with the shaft, a plurality of clutch units arranged about the gear, each unit including a sliding pinion meshing with said gear, and a rotatable sprocket, means for simultaneously rotating all of said sprockets, said sprockets being of relatively different diameters, a push rod connected with each pinion and operable to slide the latter into engagement with its respective sprocket, a disk mounted for rotation, a shift lever carried by said disk and designed to singly engage and operate said push rods, and a manually operable lever associated with said disk, whereby said clutch units can be selectively used to rotate said gear at different desired speeds.

In testimony whereof I affix my signature.

TORIBIO A. GUERRA.